Patented June 12, 1945

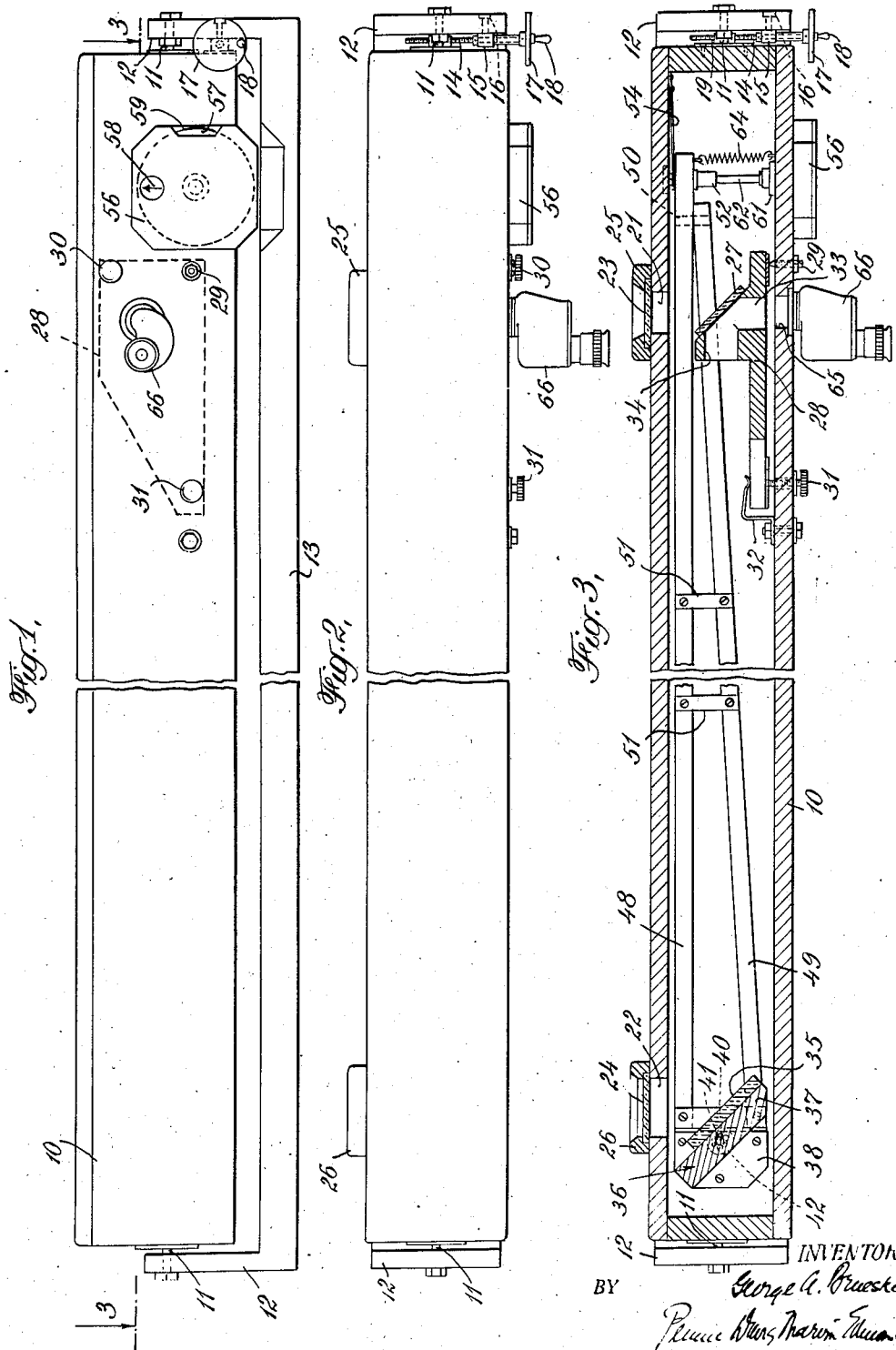
June 12, 1945. G. A. BRUESKE 2,378,282
OPTICAL INSTRUMENTS
Filed Dec. 30, 1943 2 Sheets-Sheet 1

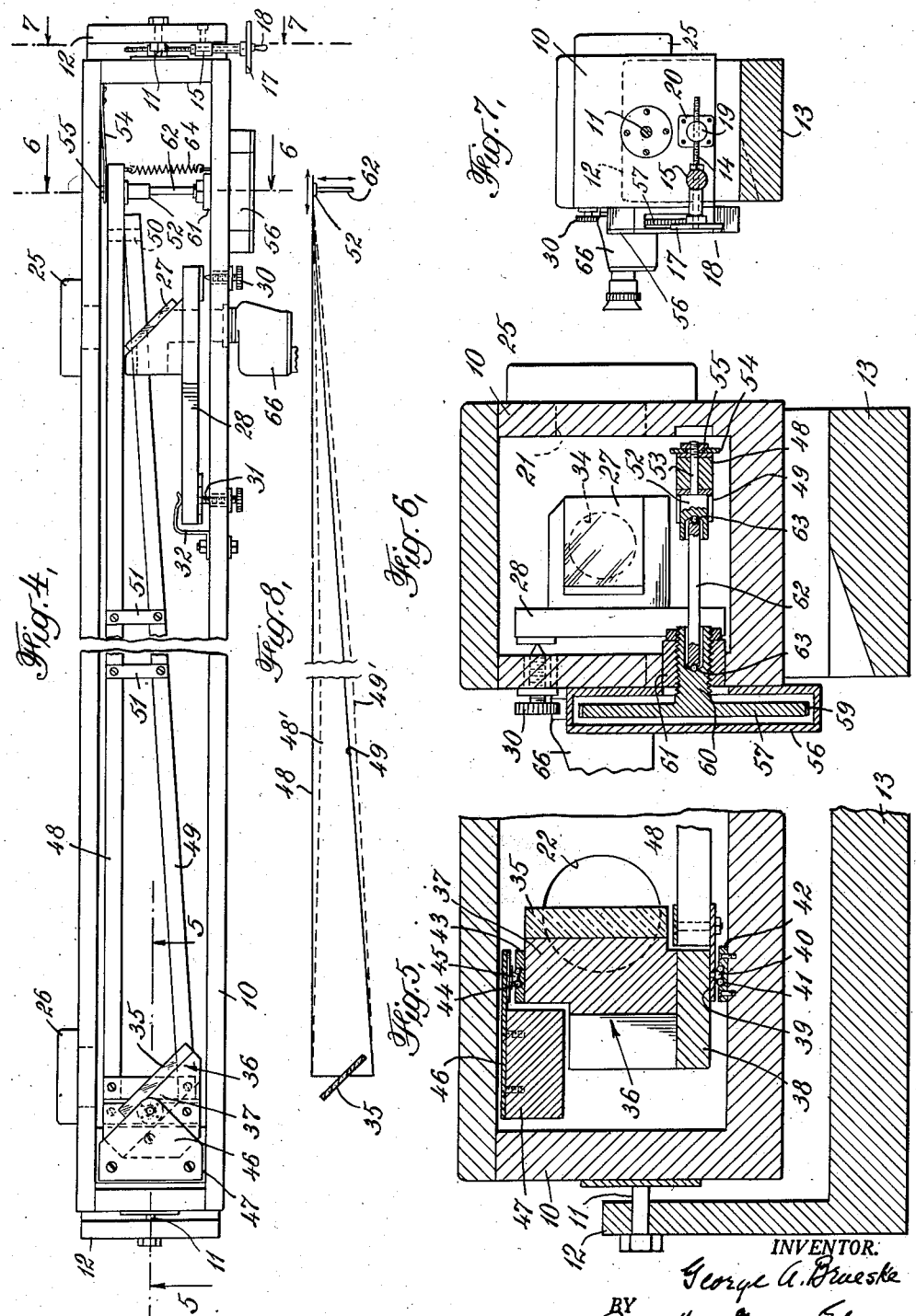

2,378,282

UNITED STATES PATENT OFFICE 2,378,282

OPTICAL INSTRUMENT

George A. Brueske, Wayzata, Minn., assignor to The Perkin-Elmer Corporation, Glenbrook, Conn., a corporation of New York Application December 30, 1943, Serial No. 516,229

6 Claims. (Cl. 88—2.4)

This invention relates to optical instruments of the type which includes a fixed and an angularly adjustable optical element, the displacement of the second element relative to the first being a measure of a quantity to be determined in the use of the instrument. More particularly, the invention is concerned with a novel operating mechanism for effecting displacement of the adjustable element, the new mechanism being so constructed that the parts thereof are not subject to such changes resulting from the action of gravity or otherwise as would introduce errors in readings. An example of an instrument in which the new mechanism can be advantageously employed is a range finder of the two reflector type, and for purposes of explanation, the use of the mechanism in such a range finder will be illustrated and described in detail. It will be readily apparent, however, that the utility of the invention is not limited to that specific instrument.

In range finders, which comprise a pair of reflectors, of which one is angularly adjustable and the other fixed in position, the reflectors are spaced apart a distance which, in a practical instrument, may be a meter or more and, if the eyepiece of the telescope of the instrument is disposed at the fixed reflector, the means by which the movable reflector is adjusted must be operable from a point near the eyepiece and must, accordingly, extend from that point to the movable reflector. In a simple form, such means may include a long lever attached at one end to the support for the movable reflector and swung about the axis of that support by means acting on its other end. The use of a long lever is particularly advantageous, in that rotation of the reflector through a small angle requires a substantially greater angular displacement of the end of the lever remote from the reflector, and this facilitates adjustment of the reflector. An ideal lever for the purpose is rigid in the plane of its movement, since any bending of the lever in that plane would result in the introduction of errors. Also, since a long lever, if unsupported between its ends, as is desirable, will be deflected under the influence of gravity, the lever must be so constructed that such gravitational deflection will not result in angular displacement of the movable reflector, since that would introduce additional errors. If the lever is made of materials which undergo any considerable change in length with temperature variations, it must be of such construction that temperature changes do not result in angular shifting of the movable reflector.

The present invention is, accordingly, directed to the provision in an optical instrument which includes a pair of optical elements, of which one is fixed and one is angularly adjustable, of a novel mechanism for displacing the movable element, the mechanism being so constructed that the occurrence of errors in readings as a result of distortion of the parts of the mechanism by the action of gravity or otherwise is avoided. The new mechanism is simple in form, light in weight, and it may be easily constructed and may be made for the most part of a wide variety of materials, including inexpensive kinds of wood.

In a range finder equipped with the new mechanism, the adjustable element may take the form of a mirror mounted on a support pivoted on an axis and disposed at a substantial distance from a mirror mounted on a relatively fixed support. The adjustable support is angularly displaced by means of a lever movable in a plane normal to the axis of rotation of the support, the lever consisting of a pair of members having ends secured to the support at spaced points and their other ends secured together. The members preferably define an isosceles triangle, of which the base is formed by a line connecting the points of attachment of the ends of the members to the adjustable support. The lever may extend substantially horizontally with the two members thereof lying substantially in the same plane normal to the axis of rotation of the lever and the end of the lever remote from the adjustable element is appropriately supported and is angularly displaced by suitable means. The two members, mounted and connected as described, provide a lever which is substantially rigid in the plane of its movement and the members, which are unsupported between their ends, are so formed that they undergo like deflections under the influence of gravity and have the same overall expansion. Changes in the members caused by the action of gravity or by temperature changes consequently cause no shift in the position of the adjustable optical element.

For a better understanding of the invention, reference may be made to the accompanying drawings, in which Fig. 1 is a view of the range finder in rear elevation;

Fig. 2 is a top plan view;

Fig. 3 is a sectional view on the line 3—3 of Fig. 1;

Fig. 4 is a plan view with the cover of the instrument removed;

Figs. 5, 6, and 7 are sectional views on the lines 5—5, 6—6, and 7—7, respectively, of Fig. 4; and Fig. 8 is a diagrammatic view showing the operation of the lever.

The range finder in the form illustrated in the drawings includes a casing 10, which may be made of any suitable material, including wood. The casing is mounted for movement about a horizontal axis on pivots 11 at its ends, the pivots being supported in arms 12 extending upward from a base 13. The angular position of the casing on its pivots is adjustable by means of a threaded shaft 14 mounted in a bearing 15 pivotally mounted on a pin 16 extending through one of the arms 12, the shaft carrying a disc 17 with an eccentric handle 18. The shaft 14 is threaded through a nut 19 pivotally mounted on a plate 20 attached to the end of the casing.

The casing is of suitable length and in its front wall are apertures 21, 22 over which are mounted windows 23, 24 in cells 25, 26, respectively. Within the casing and opposite the aperture 21 is a reflector or mirror 27 mounted at an angle of approximately 45° to the axis of the aperture on a supporting block 28. This block is mounted under spring loading on the rear wall of the casing at three points, at one of which a conically pointed screw 29 mounted in the rear wall of the casing extends into an opening in a plate on the block. At the second point, a screw 30, which is threaded through the wall of the casing and has an enlarged head exposed on the outer wall of the casing, bears against a flat plate on the block. At the third point, the block is provided with a plate with a slot or groove on a line with the first point, and the groove receives the inner end of a screw 31 threaded through the wall of the casing and having an enlarged head outside the casing. Leaf springs, of which one is shown at 32, are mounted on the inner wall of the casing to keep the block 28 against the locating screws and by adjustment of screws 30 and 31, the block and its mirror can be set in the desired position.

The block 28 is provided with a passage 33 in substantial alignment with aperture 21 and leading from the rear surface of mirror 27 and a second passage 34 in block 28 at right angles to the passage 33 leads to the rear surface of the mirror. The mirror is formed so that it partially reflects and partially transmits and in the construction shown, the desired result is obtained by providing the rear surface of the mirror with partial silvering.

A second mirror 35 is mounted on a support generally designated 36, which is opposite the aperture 22. The support 36 comprises a block 37 attached to a crossbar 38, to the under surface of which is attached a plate 39 provided on its under surface with a conical stud 40 which is seated within a row of balls 41 running in a circular recess on the upper face of a plate 42 attached to the bottom wall of the casing. At its upper end, the block 37 is provided with a plate 43 formed with a circular recess containing balls 44, in which is seated a conical stud 45 on a metal plate 46 attached to crossbar 47 which is secured to the front and rear walls of the casing. The support 36 is thus mounted for free rotation about a vertical axis through the studs 40, 45 and the support and the mirror carried thereby may be angularly displaced by means of a lever which extends substantially the full length of the casing.

The lever comprises a pair of elements in the form of bars 48, 49 which are secured to plate 39 attached to the support, the points of connection of the bars to plate 39 lying at equal distances on opposite side of the axis of rotation of the plate, as shown in Figs. 3 and 4. The bars extend through the casing convergently and their ends remote from the adjustable support are secured together by a bolt 50. In the construction illustrated, the bars are of substantially the same effective length and thus define a substantially isosceles triangle, of which the base is formed by the line between the points of connection of the bars to the plate 39.

The lever elements are so formed as to undergo like deflections under the influence of gravity and they are preferably made of the same material and have the same effective length and cross-sectional area. When so made, the elements have the same bending and expansion characteristics, so that they are not differentially affected by gravity or by temperature changes and, consequently, such changes as they may thus undergo do not result in angular displacement of support 36 and mirror 35 thereon. It is not necessary, however, that the elements be of the same material or of the same effective length and cross-section, so long as their gravitational deflections are substantially the same and their overall variations in length with temperature changes are also substantially the same. It is more convenient to employ like elements for the reasons stated, and like bars made of the same kind of wood are altogether satisfactory for the purpose. Between their ends, the bars are connected by links 51 to insure equal deflection.

To provide for swinging movement of the lever, bar 48 may extend a short distance beyond the bolt 50 and on this extension of the bar is mounted a socket member 52 attached to a bolt 53 which extends through the bar and through a spring plate 54 secured to the inner face of the front wall of the housing. A nut 55 on the end of bolt 53 holds the socket member in place and also connects the spring to the bar. For the latter purpose, the nut is formed with a reduced neck extending loosely through an enlarged hole in the spring so that play in these parts is permitted.

A housing 56 mounted on the rear wall of the casing encloses a dial 57 bearing graduations on its face which are visible through an aperture in the face of the housing which is closed by a window provided with an index 58. The edge 59 of the dial is roughened and it is accessible through an aperture in a side wall of the housing. The dial is mounted on a screw 60 which extends through an internally threaded sleeve 61 mounted in the rear wall of the casing and the inner end of the screw is formed with a socket open to the interior of the casing. A push rod 62 having balls 63 seated in its ends extends between the neck and the member 52 and the rod enters both sockets and the balls are seated at the bottom of the latter. A spring 64 attached at one end to the extension of bar 48 and at its other end to the rear wall of the casing tends to swing the free end of the lever backwardly, so that the push rod is held firmly in place. By rotation of the dial 57, the push rod may be moved endwise to cause the lever and the adjustable support 36 to be swung in a counterclockwise direction, as seen in Fig. 3, and upon reverse rotation of the dial, spring 64 moves the lever and the support in a reverse direction. The pitch of the screw threads on the dial neck 60 is so chosen that the lever may be swung through the desired small arc with one rotation of the dial.

An aperture 65, slightly offset axially from the aperture 21, is formed in the rear wall of the housing and a telescope 66 is mounted on that wall of the casing in alignment with aperture 65. The telescope receives a light beam which enters aperture 21 and is transmitted through mirror 27, and another beam, which enters through aperture 22 and is reflected from mirror 35 and mirror 27.

By the initial adjustment and calibration of the instrument, the mirrors 27 and 35 are mounted in such relation that the images visible through the telescope of objects at various ranges lie in coincidence when the dial is set for the respective ranges. As the displacement of mirror 35 is a measure of the range, any accidental shift in the position of that mirror caused, for example, by gravitational distortion of the parts of the mechanism for shifting the mirror, would, accordingly, result in erroneous readings.

In the new mechanism for displacing the angularly displaceable mirror, the longitudinal elements of the lever function in the manner of a truss to give the lever substantial rigidity in the plane of its movement. Also the elements have like deflections under the influence of gravity and like total expansions with temperature changes. Accordingly, any deformation of the lever structure resulting from the action of gravity or otherwise does not produce an angular displacement of mirror 35, but, instead, shifts the point of application of the force to the lever along the axis of the lever, as is shown in Fig. 8. This is true, because the bars 48, 49 are connected to plate 39 at opposite sides of its axis of rotation. Accordingly, if the bars are shortened by gravitational deflection or lengthened by expansion resulting from a temperature increase, the force that one bar applies to plate 39 tending to turn mirror 35 will be balanced by a force in the opposite direction applied to plate 39 by the other bar.

In Fig. 8, the lever is to be regarded as movable in a plane inclined to the horizontal, as would occur, if the instrument were tilted in its mounting. Under such conditions, the force of gravity has a component causing lateral deflection of the lever elements 48, 49, so that they assume the forms indicated at 48', 49'. The like deflections of the elements so produced cause a movement of socket member 52 in a direction substantially along the axis of the lever but do not cause rotation of the mirror.

The desired result can be obtained, whether the lever elements are made of the same materials or of different materials, provided the requirements above set forth are fulfilled. For convenience and simplicity in manufacture, it is preferable to make the lever elements of the same material and of the same effective cross-sectional area and of the same effective length and the elements may be advantageously made of suitable lengths cut from a wooden bar of uniform cross-section.

I claim:

1. In an optical instrument, which comprises a pair of optical elements and spaced supports for the respective elements, one support being stationary and the other angularly adjustable about an axis, the combination of a lever extending at right angles to said axis and operable to effect angular displacement of the second element, said lever being formed of a pair of members of substantially equal effective length having ends connected to the adjustable support at equal distances on opposite sides of the axis about which said support is adjustable and their other ends connected together, means for supporting the end of the lever remote from the adjustable support, said members being unsupported between their ends and having like bending characteristics, and means for angularly displacing said remote end of the lever.

2. In an optical instrument which comprises a a pair of optical elements and spaced supports for the respective elements, one support being stationary and the other angularly adjustable about an axis, the combination of a lever extending at right angles to said axis and operable to effect angular displacement of the second element, said lever being formed of a pair of members having ends connected to the adjustable support at points equally spaced on opposite sides of the axis about which said support is adjustable and their other ends connected together, the members being of substantially the same effective length and made of like materials and having like bending characteristics, means for supporting the end of the lever remote from the adjustable support, said members being unsupported between their ends, and means for angularly displacing said remote end of the lever.

3. In an optical instrument which comprises a pair of optical elements and spaced supports for the respective elements, one support being stationary and the other angularly adjustable about an axis, the combination of a lever extending at right angles to said axis and operable to effect angular displacement of the second element, said lever being formed of a pair of members having ends connected to the adjustable support at points spaced at equal distances on opposite sides of the axis about which said support is adjustable and their other ends connected together to define a substantially isosceles triangle, the base of which is defined by a line connecting the points at which the ends of the lever are connected to the adjustable support, the members having like expansion characteristics, means for supporting the lever adjacent the apex of said triangle, and means for angularly displacing the end of the lever remote from the adjustable support, said members being unsupported between their ends and undergoing like deflections under the influence of gravity.

4. In an optical instrument which comprises a pair of optical elements and spaced supports for the respective elements, one support being stationary and the other angularly adjustable about an axis, the combination of a lever extending at right angles to said axis and operable to effect angular displacement of the second element, said lever being formed of a pair of wooden bars having ends connected to the adjustable support at points spaced at equal distances on opposite sides of the axis about which said support is adjustable and their other ends connected together so that the bars define a triangle, means for supporting the end of the lever remote from the adjustable support, the bars being unsupported between their ends and undergoing like deflections under the influence of gravity, and means for angularly displacing said remote end of the lever.

5. In a range finder which comprises a casing, a pair of reflectors within the casing and spaced supports for the respective reflectors, one of the supports being stationary and the other support being mounted for angular adjustment about an axis, the combination of a lever extending at right angles to said axis and operable to effect angular displacement of the second reflector, such displacement being a measure of the range, said lever being formed of a pair of members having ends connected to the adjustable support at equal distances on opposite sides of the axis about which said support is adjustable and their other ends connected together, means for supporting the end of the lever remote from the adjustable support, said members being unsupported between their ends and undergoing like deflections under the influence of gravity and like expansions as a result of temperature changes, a dial mounted for rotation on the outside of the casing wall, and means within the casing operable by rotation of the dial for angularly displacing said remote end of the lever.

6. In a range finder which comprises a pair of reflecting elements and spaced supports for the elements, one support being stationary and the other angularly adjustable, about an axis the angular displacement of one element relative to the other being a measure of the range, the combination of a lever extending at right angles to said axis and operable to effect angular displacement of the second element, said lever being formed of a pair of members having ends connected to the adjustable support at points spaced at equal distances on opposite sides of the axis about which said support is adjustable and their other ends connected together, said members having substantially the same effective length, means for supporting the end of the lever remote from the adjustable support, said members being unsupported between their ends and undergoing like deflections under the influence of gravity, and means for angularly displacing said remote end of the lever to change the relation between the elements.

GEORGE A. BRUESKE.